United States Patent
Nishijo et al.

(10) Patent No.: US 8,122,288 B2
(45) Date of Patent: Feb. 21, 2012

(54) REDUNDANT SYSTEM, CONTROL APPARATUS, AND CONTROL METHOD

(75) Inventors: Hiroaki Nishijo, Kawasaki (JP); Yasuhiko Hanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/683,248

(22) Filed: Jan. 6, 2010

(65) Prior Publication Data

US 2010/0218032 A1    Aug. 26, 2010

(30) Foreign Application Priority Data

Feb. 25, 2009 (JP) ................................. 2009-041731

(51) Int. Cl.
*G06F 11/00* (2006.01)
(52) U.S. Cl. ........................ 714/6.32; 714/6.2
(58) Field of Classification Search .................. 714/6.2, 714/6.21, 6.3, 6.32
See application file for complete search history.

(56) References Cited

U.S. PATENT DOCUMENTS

| | | | | |
|---|---|---|---|---|
| 4,672,592 A * | 6/1987 | Skinner | ........................ | 367/159 |
| 5,651,110 A * | 7/1997 | Powers et al. | ................. | 714/6.32 |
| 5,928,367 A * | 7/1999 | Nelson et al. | ................. | 714/6.3 |
| 5,997,166 A * | 12/1999 | Flood | ................................ | 700/2 |
| 6,920,580 B1 * | 7/2005 | Cramer et al. | ................ | 714/4.11 |
| 6,968,242 B1 * | 11/2005 | Hwu et al. | ........................ | 700/82 |
| 7,159,234 B1 * | 1/2007 | Murphy et al. | ................. | 725/87 |
| 2008/0126845 A1* | 5/2008 | Luo et al. | ........................... | 714/6 |

FOREIGN PATENT DOCUMENTS

| | | | |
|---|---|---|---|
| JP | 03-253945 | A | 11/1991 |
| JP | 06-075813 | A | 3/1994 |
| JP | 11-053213 | A | 2/1999 |

* cited by examiner

*Primary Examiner* — Joshua Lohn
(74) *Attorney, Agent, or Firm* — Maschoff Gilmore & Israelsen

(57) ABSTRACT

A redundant system includes a redundant apparatus and a control unit that controls power supplied to the redundant apparatus. The redundant apparatus includes a state management unit that manages an operational state of the redundant apparatus, and a response unit that returns the operational state to the control unit. The control unit includes a first requesting unit that requests a redundant apparatus that operates as an operation system for the operational state information, a first determination unit that determines whether the response to the request is returned within a predetermined time, a second determination unit that determines whether the operational state is normal if the response is returned within the predetermined time, and a shutdown unit that shuts down the power supply to the redundant apparatus, if the second determination unit determines that the operational state is not normal.

19 Claims, 14 Drawing Sheets

REDUNDANT SYSTEM, CONTROL APPARATUS, AND CONTROL METHOD

CROSS-REFERENCE TO RELATED APPLICATION

This application is based upon and claims the benefit of priority of the prior Japanese Patent Application No. 2009-041731, filed on Feb. 25, 2009, the entire contents of which are incorporated herein by reference.

FIELD

The embodiments discussed herein are related to a redundant system.

BACKGROUND

Conventionally, a system, which is constituted by a plurality of control units and which has redundancy based on redundant internal processing functions, is known. Such a system includes a monitoring apparatus that monitors operational states of redundant configurations of all constituent units and that controls the start and end of operations. An example of such a system with redundancy includes a virtual tape drive. A group of hierarchically connected data processing units is duplexed to form physical redundancy in the virtual tape drive. When a control unit in the duplexed group detects an abnormality in an operational response of a lower unit as a control target, the control unit shuts down the command issue or communication connection to the lower unit in which the abnormality is detected. After the shutdown, the control unit switches a connection path to another redundant group (standby system) and replaces processing with the standby system to continue the operation. The control unit waits for the termination based on a termination command of the lower unit or the self-termination before switching the connection path from the terminated lower unit to the standby system.

An RAS (Reliability, Availability, and Serviceability) automatic test system that automatically performs an RAS test of an apparatus is disclosed, for example, in Japanese Patent Laid-Open No. 11-53213.

However, when there is a failure in a lower unit, instead of reacting to a termination command from a control unit that has detected the abnormality, the system may continue an operation in the presence of the abnormality. In such a case, the control unit waits for the termination of the lower unit with the abnormality before switching to the standby system. Therefore, the transition of the operation in process cannot be performed. As a result, there is a problem that switching to the standby system to replace the lower unit with the abnormality is impossible. Under these circumstances, operations cannot be continued, and the entire system terminates. This problem may occur in a variety of other systems constituted by a redundant apparatus, in addition to occurring in virtual tape drives.

A case with such a problem will be specifically described with reference to a drawing. FIG. 14 is a diagram illustrating a hierarchical structure of a monitored apparatus as a lower unit in a virtual tape drive.

As illustrated in FIG. 14, in the monitored apparatus, a BIOS operates on hardware, an OS and an I/O driver operate on the BIOS, and a kernel and an I/O control unit operate on the OS and the I/O driver. A basic processing program of the virtual tape drive operates on the kernel and the I/O control unit, and a functional process control program operates on the basic processing program. A response control program operates on the functional process control program. In the controlled apparatus with such a hierarchical structure, the response transmissions to an upper host apparatus, a monitoring apparatus, and another monitored apparatus are performed in different levels. Specifically, the response control program performs command response transmission to the upper host apparatus, the functional process control program performs status response transmission to the monitoring apparatus, and the I/O control unit performs survival check response transmission to the other monitored apparatus. In such a monitored apparatus, for example, if the functional process control program is hung up, the monitoring apparatus cannot perform the status response transmission to the monitored apparatus. However, in the hierarchical structure of the monitored apparatus, the I/O control unit below the functional process control program is not affected by the hanging, and the I/O control unit automatically returns a response to the survival check from the other monitored apparatus. As with the I/O control unit, the basic process control program can also be operated without being affected by the hanging. In such a case, the monitored apparatus returns a response to the survival check and continues to operate, although there is an abnormality in the functional process control program and the response control program above the functional process control program. Since the level that performs the status response transmission to the monitoring apparatus is hung up, the monitoring apparatus cannot terminate the monitored apparatus. As a result, switching to the standby system to replace the monitored apparatus is impossible. More specifically, if the operation of a lower unit with abnormality does not terminate for some reason, the redundancy arranged in preparation for abnormalities is not effective. The problem may occur not only in the virtual tape drive, but also in any system constituted by a redundant apparatus.

SUMMARY

According to an aspect of the invention, a redundant system includes a redundant apparatus in a redundant configuration and a control unit that controls a power supply unit that supplies power to the redundant apparatus. The redundant apparatus includes a state management unit that manages operational state information indicating an operational state of the redundant apparatus, and a response unit that returns the operational state information managed by the state management unit to the control unit in response to a request of the operational state information by the control unit. The control unit includes a first requesting unit that requests the redundant apparatus that operates as an operation system for the operational state information, a first determination unit that determines whether the response by the response unit to the request by the first requesting unit is returned within a predetermined time, a second determination unit that determines whether the operational state indicated by the operational state information as the response to the request by the first requesting unit is normal if the first determination unit determines that the response to the request by the first requesting unit is returned within the predetermined time, and a shutdown unit that shuts down the power supply to the redundant apparatus, to which the first requesting unit has requested for the operational state information, if the second determination unit determines that the operational state indicated by the operational state information as the response to the request by the first requesting unit is not normal.

The object and advantages of the invention will be realized and achieved by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
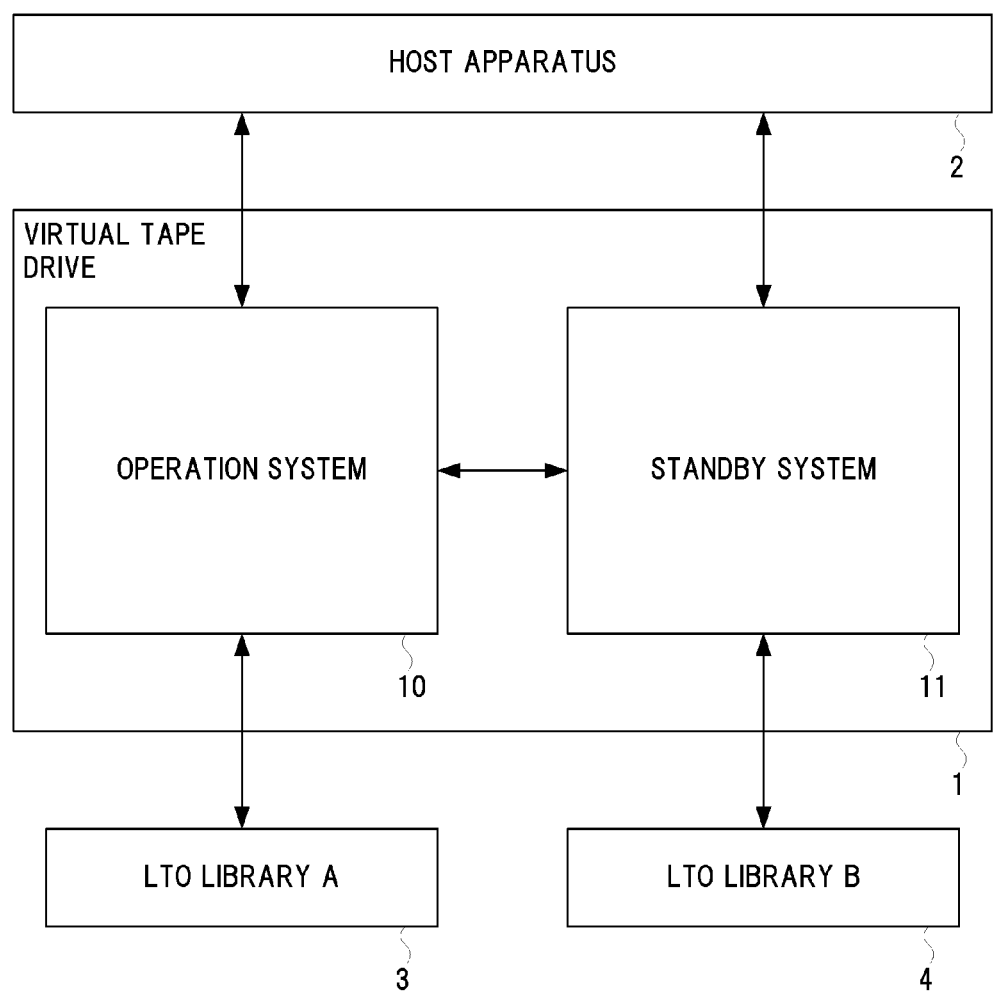
FIG. 1 is a diagram illustrating a configuration of a virtual tape system according to an embodiment.
Figure 2:
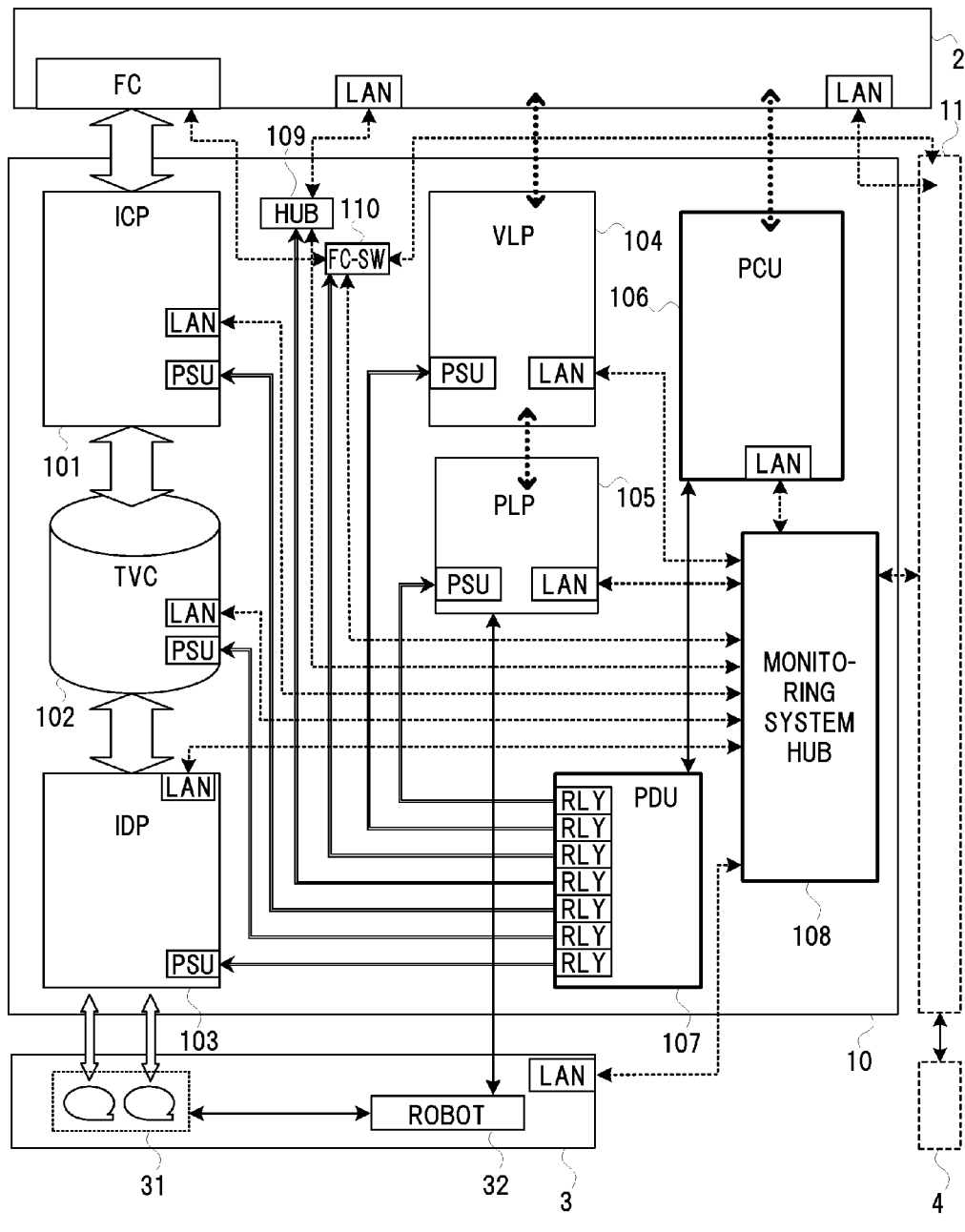
FIG. 2 is a diagram illustrating a configuration, connection paths, and power supply paths of a virtual tape drive according to the embodiment of FIG. 1.
Figure 3:
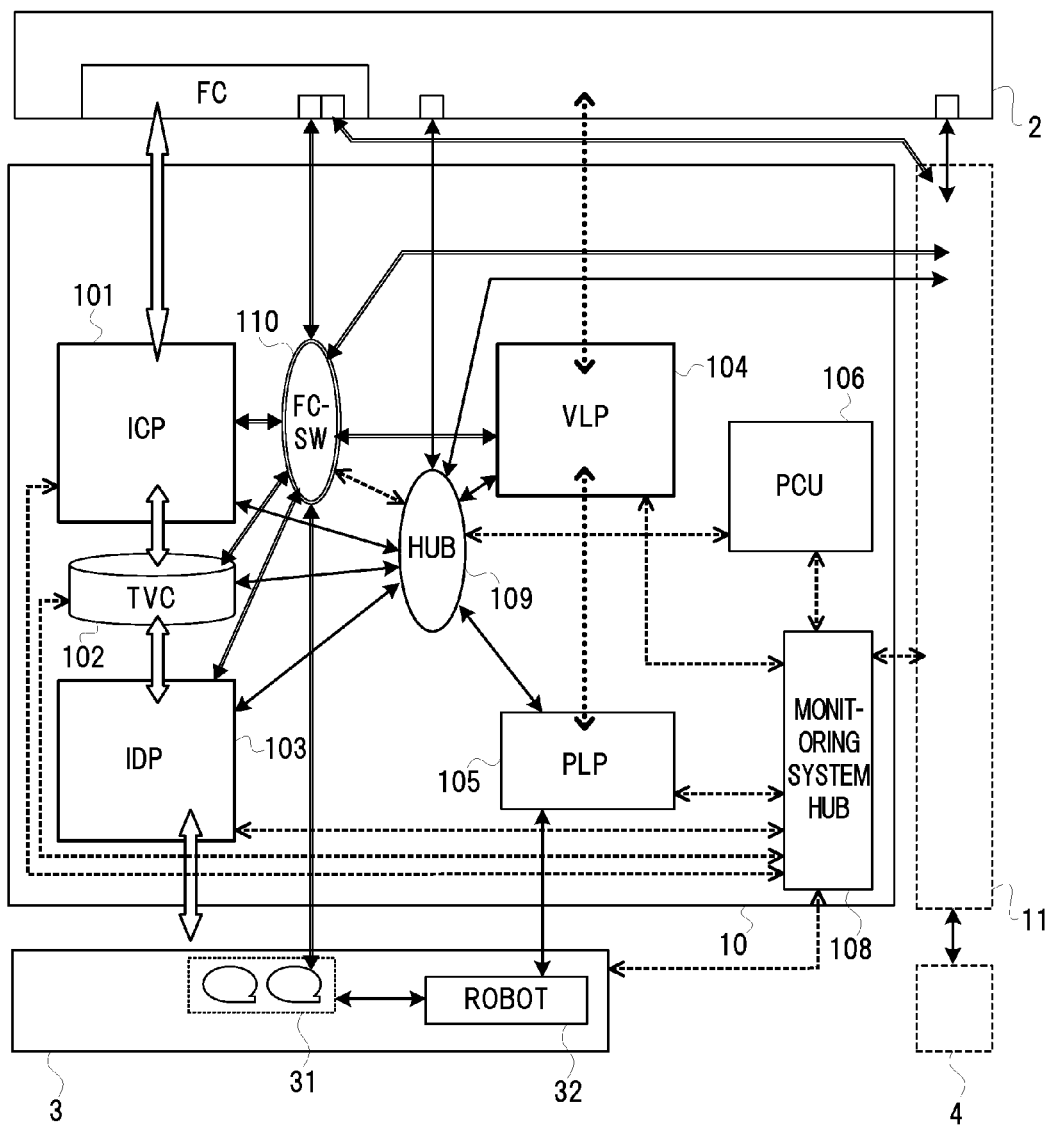
FIG. 3 is a diagram illustrating monitoring control paths, control communication paths, and data transmission paths of the virtual tape drive according to the embodiment of FIG. 1.

A virtual tape drive according to an embodiment will be described first. FIG. 1 is a diagram illustrating a configuration of a virtual tape system according to the present embodiment. FIG. 2 is a diagram illustrating a configuration, connection paths, and power supply paths of the virtual tape drive according to the present embodiment. FIG. 3 is a diagram illustrating monitoring control paths, control communication paths, and data transmission paths of the virtual tape drive according to the present embodiment.

As illustrated in FIG. 1, the virtual tape system according to the present embodiment includes a virtual tape drive 1 (redundant system), a host apparatus 2, an LTO (Linear Tape-Open) library A 3, and an LTO library B 4. The host apparatus 2 is an upper apparatus of the virtual tape drive 1 and may be operated by a user. The host apparatus 2 instructs the virtual tape drive 1 to read and write data. The virtual tape drive 1 includes an operation system 10 and a standby system 11 with redundancy for the operation system 10. In the present embodiment, the operation system 10 and the standby system 11 can be configured in the same way, and the configuration of the standby system will not be described in the following description. The operation system 10 (or the standby system 11) reads out data of the LTO in the LTO library A 3 (or the LTO library B 4) and transfers the data to the host apparatus 2. The operation system 10 temporarily stores the data transferred by the host apparatus 2 and writes the stored data into the LTO in the LTO library A 3.

As illustrated in FIG. 2, each of the operation system 10 and the standby system 11 in the virtual tape drive 1 includes an ICP (Integrated Channel Processor) 101, a TVC (Tape Volume Cache) 102, an IDP (Integrated Device Processor) 103, a VLP (Virtual Library Processor) 104, a PLP (Physical Library Processor) 105, a PCU (Power Control Unit) 106, a PDU (Power Distribution Unit) 107, a monitoring system hub 108, a hub 109, and an FC-SW (Fibre Channel Switch) 110. The LTO tape library A 3 and the LTO tape library B 4 include at least one LTO 31 and a robot 32 that sets the LTO 31 to a drive not illustrated. At least some of the foregoing elements illustrated in FIG. 2 are apparatuses in the virtual tape drive 1.

The TVC 102, which is a storage drive constituted by RAID in one example, stores logical volume data. The ICP 101, which is connected to the host apparatus 2, controls transmission and reception of the logical volume data stored in the TVC 102 and causes the TVC 102 to function as a subsystem of a virtual tape drive. The VLP 104 receives a mount request from the host apparatus 2, mounts the logical volume on the virtual tape drive, manages an information database indicating the relationship between the logical volume and the physical volume, and stores the data in the LTO 31. The IDP 103 receives an instruction from the VLP 104, stores the logical volume data on the TVC 102 in the LTO 31, reads out the data of the LTO 31, and restores the data in the TVC 102. The PLP 105 receives an instruction from the VLP 104 and controls the robot 32. The PDU 107 supplies and shuts down power for apparatuses in the virtual tape drive 1. The PCU 106 controls the PDU 107 and supplies and disconnects power for the apparatuses in the virtual tape drive 1. The PCU 106 also monitors operational states of the apparatuses in the virtual tape drive 1 and issues an instruction for terminating the operation or an instruction for shutting down the power to an apparatus in which an abnormality is detected. The monitoring system hub 108 relays a monitoring control data communication using LANs in the apparatuses of virtual tape drive 1. The hub 109 relays a control data communication using a LAN in the host apparatus 2. The FC-SW 110 relays data communication paths of the logical volume processed in the virtual tape drive 1.

In the virtual tape drive 1, power is supplied to PSUs (Power Supply Units) of the apparatuses through RLYs (Relays) of the PDU 107. The apparatuses in the virtual tape drive 1 are connected by LANs to the monitoring system hub 108 and the hub 109. As a result of the connections, the monitoring control communication paths and the control communication paths illustrated in FIG. 3 are established in the virtual tape drive 1. The monitoring control communication paths and the control communication paths illustrated in FIG. 3 allow communications by the apparatuses between the operation system 10 and the standby system 11. The establishment of the monitoring control communication paths by the monitoring system hub 108, which is different from the hub 109 that establishes the control communication paths, can reduce the risk in monitoring. An FC (Fibre Channel) network relayed by the FC-SW 110 realizes data transmission paths between the host apparatus 1 and the LTO drive through the ICP 101, the TVC 102, and the IDP 103. The control communication path is a path for performing a control communication related to a virtual drive function, and the monitoring control communication path is a path for the PCU 106 to monitor the state of other apparatuses in the virtual tape drive 1. In the following description, an apparatus, in which the power is controlled and the state is monitored by the PCU 106, will be called a monitored apparatus (redundant apparatus). In the virtual tape drive 1, the monitored apparatuses are the ICP 101, the TVC 102, the IDP 103, the VLP 104, and the PLP 105. The monitored apparatuses are apparatuses having redundant configurations in the virtual tape drive 1 and in which the power is supplied by the PDU 107. FIG. 3 also illustrates a logical process flow in the virtual tape drive 1.

Figure 4:
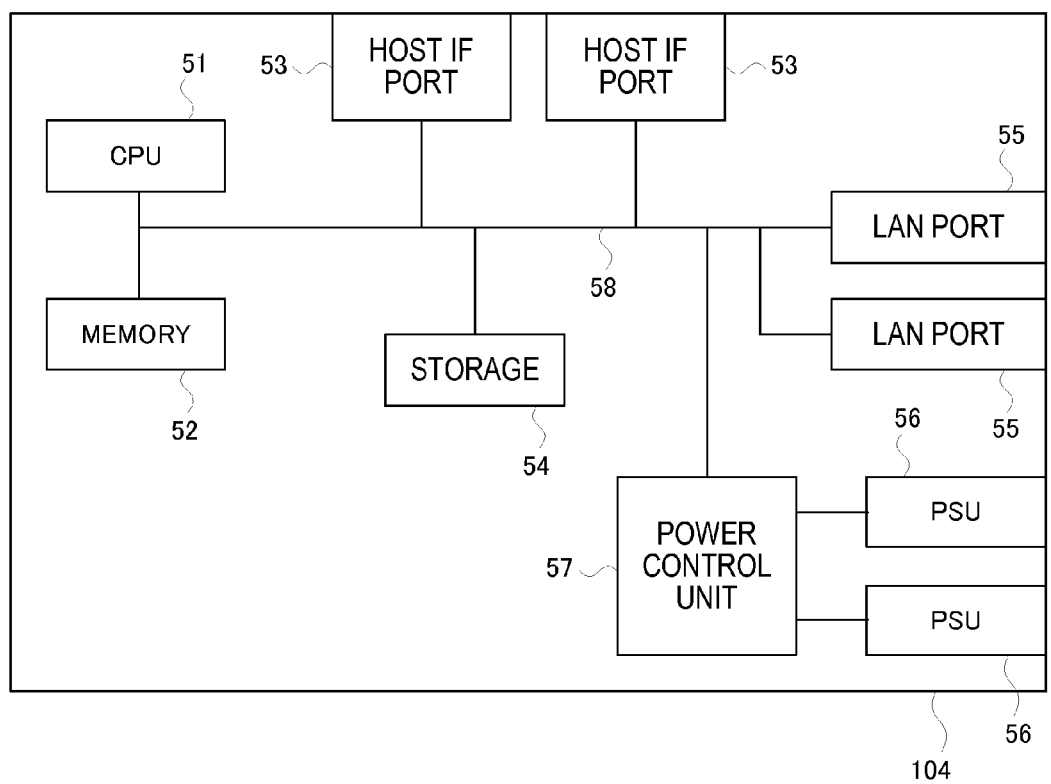
FIG. 4 is a diagram illustrating a hardware configuration of a VLP (Virtual Library Processor)
Figure 5:
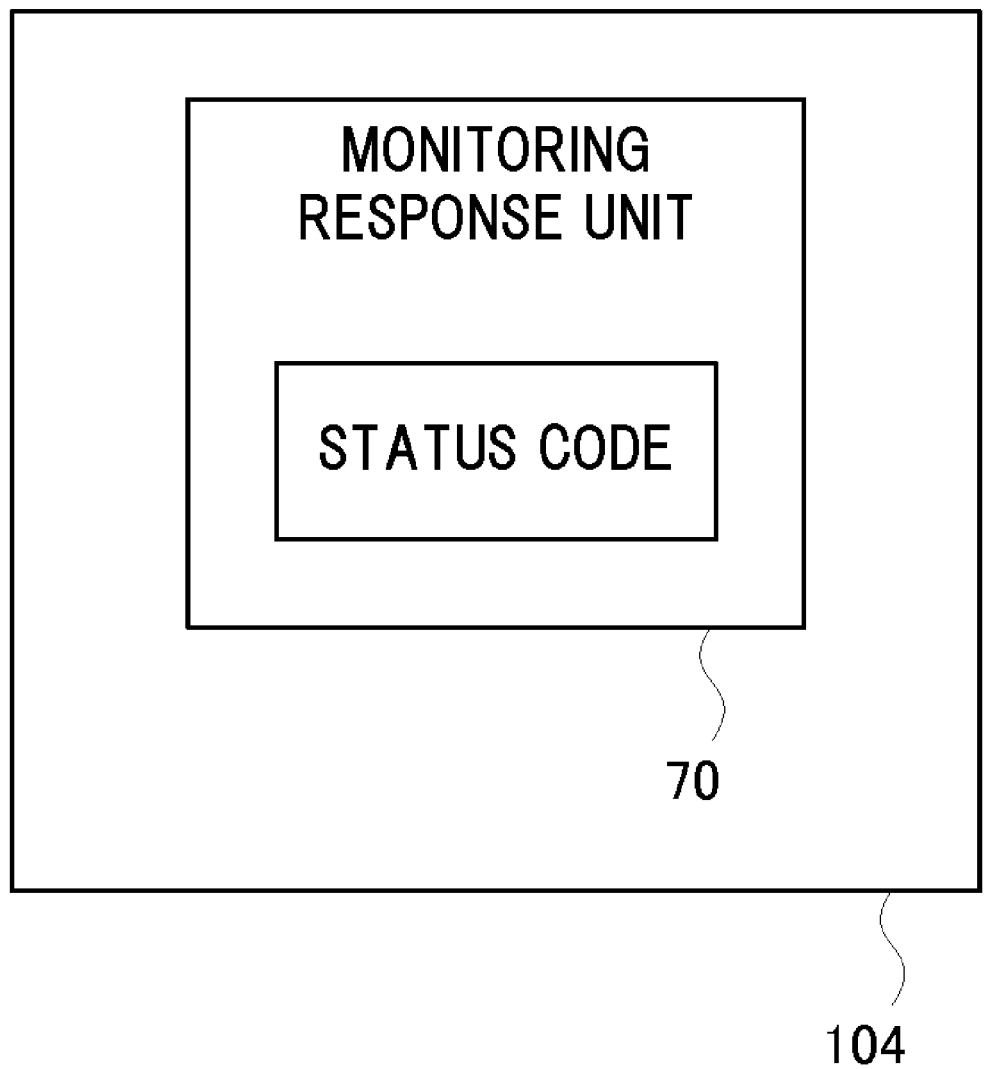
FIG. 5 is a diagram illustrating a functional configuration of a VLP as a monitored apparatus.

The monitored apparatus will now be described. A VLP serves as an example of the monitored apparatus herein, and the configuration of the monitored apparatus will be described. FIG. 4 is a diagram illustrating a hardware configuration of a VLP. FIG. 5 is a diagram illustrating a functional configuration of a VLP as a monitored apparatus.

As illustrated in FIG. 4, the VLP 104 includes, as hardware, a CPU (Central Processing Unit) 51, a memory 52, host IF ports 53, a storage 54, LAN ports 55, PSUs 56, a power control unit 57 that controls the PSUs 56, and a bus 58 connecting these components. As illustrated in FIG. 5, the VLP 104 as a monitored apparatus includes, as a function, a monitoring response unit 70 (a state management unit, a response unit, a reference unit, a fifth determination unit, and a switch unit). The CPU 51 substantially realizes the function. The monitoring response unit 70 manages a status code as information indicating the state of the apparatus and returns the status code as a response to a request from the PCU 106. The status code indicates "normal", "abnormal", "in process", "blocked", or "switched". "Normal" indicates that the VLP 104 is functioning normally. "Abnormal" indicates that the VLP 104 is not functioning normally. "In process" indicates that the VLP 104 is in process of terminating the operation, in process of shutting down the power, or in process of switching to another system. "Blocked" indicates a state that the operation is terminated and that switching to another system is possible. "Switched" indicates that the switch of the VLP 104 to another system is completed.

Figure 6:
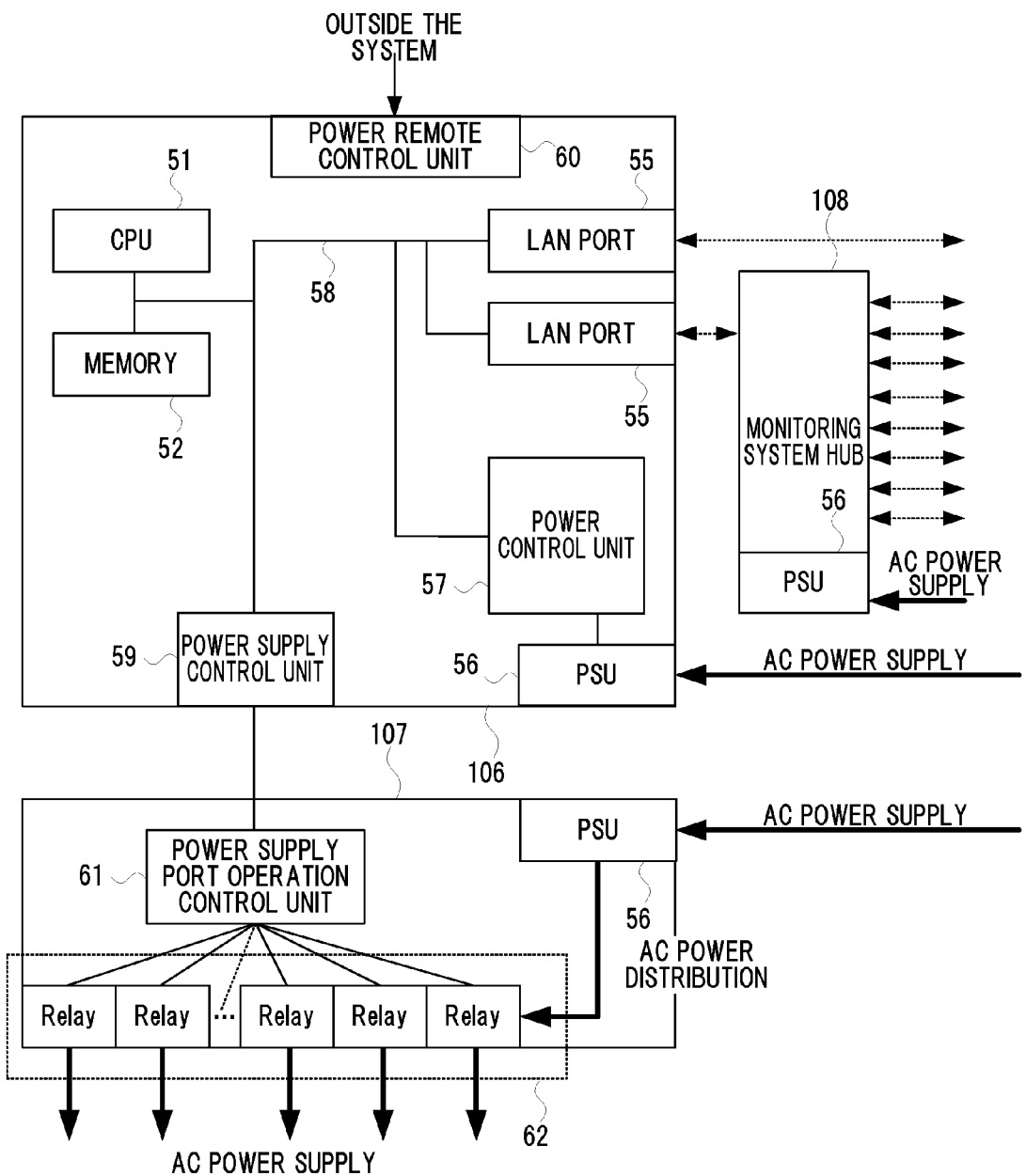
FIG. 6 is a diagram illustrating hardware configurations of a PCU (Power Control Unit) and a PDU (Power Distribution Unit)
Figure 7:
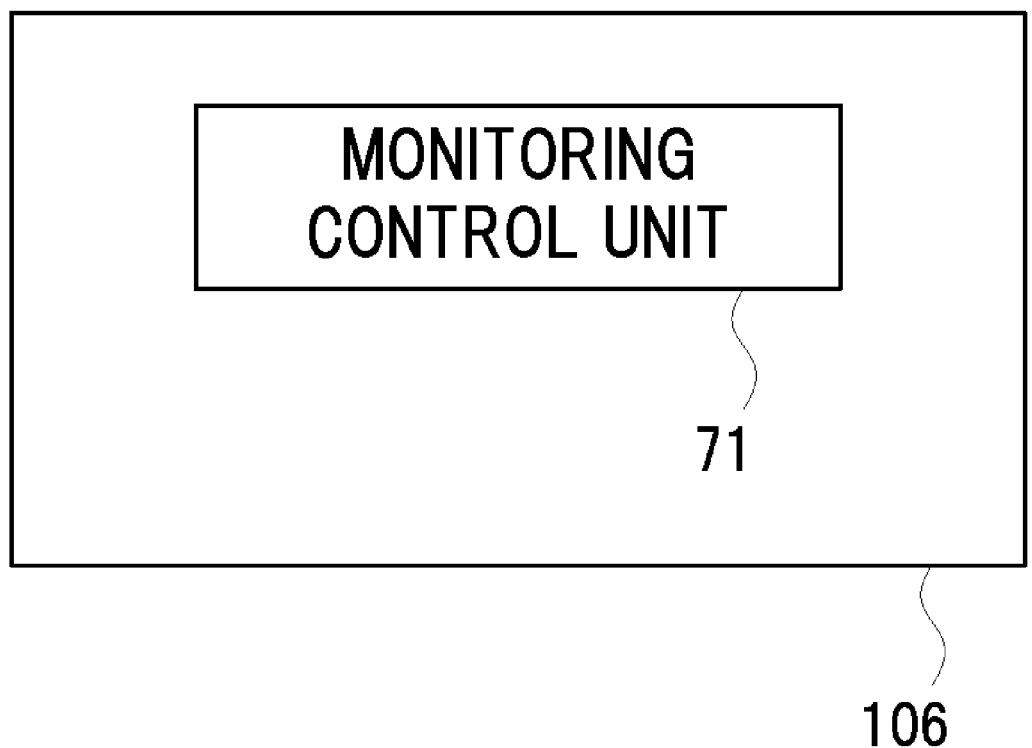
FIG. 7 is a diagram illustrating a functional configuration of a PCU.

Configurations of the PCU and the PDU will now be described. FIG. 6 is a diagram illustrating hardware configurations of a PCU and a PDU. FIG. 7 is a diagram illustrating a functional configuration of a PCU.

As illustrated in FIG. 6, the PCU 106 includes, as hardware, the CPU 51, the memory 52, the LAN ports 55, the PSUs 56, the power control unit 57, a power supply control unit 59, a power remote control unit 60, and the bus 58 connecting these components. The power remote control unit 60 receives a power OFF instruction from outside the virtual tape system.

The PDU 107 includes, as hardware, the PSUs 56, a plurality of relays 62, and a power supply port operation control unit 61 that controls the plurality of relays. The power supply port operation control unit 61 controls power supply/shutdown of the plurality of relays 62. The power supply port operation control unit 61 is connected to the power supply control unit 59 of the PCU 106 and supplies and shuts down the power based on an instruction of the PCU 106 through the power supply control unit 59.

As illustrated in FIG. 6, power is independently supplied to the PCU 106, the PDU 107, and the monitoring system hub 108.

The PCU 106 also includes, as a function, a monitoring control unit 71 (a first requesting unit, a second requesting unit, a first determination unit, a second determination unit, a third determination unit, a fourth determination unit, and a shutdown unit). The CPU 51 substantially realizes the function. The monitoring control unit 71 monitors the state of the monitored apparatus and controls the supply of power to the monitored apparatus through the PDU 107 based on the state.

PCU 106 and monitoring control unit 71 are examples of control apparatuses that operate as described herein.

Figure 8:
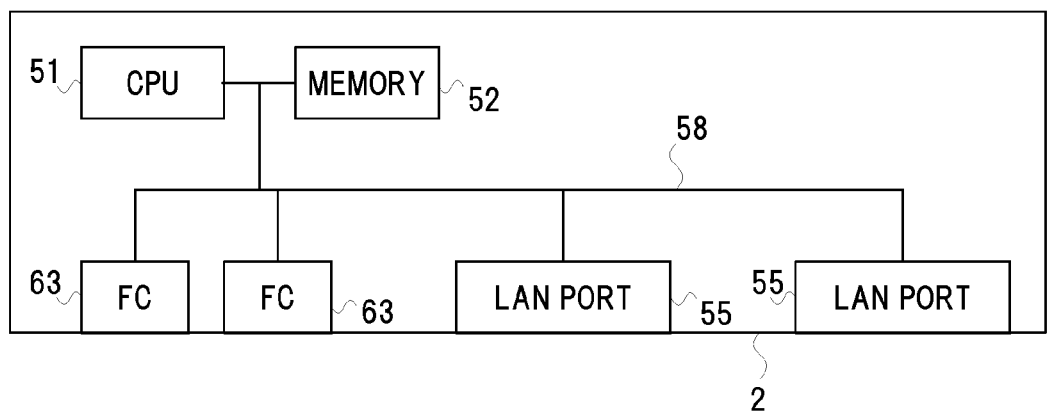
FIG. 8 is a diagram illustrating a hardware configuration of a host apparatus.
Figure 9:
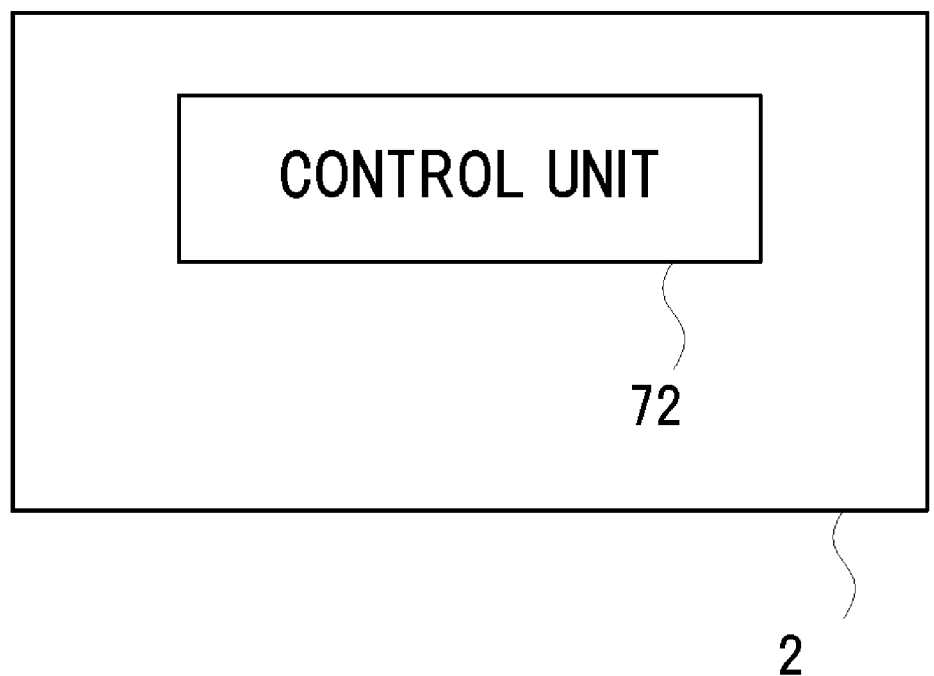
FIG. 9 is a diagram illustrating a functional configuration of the host apparatus.

A configuration of the host apparatus 2 will now be described. FIG. 8 is a diagram illustrating a hardware configuration of a host apparatus. FIG. 9 is a diagram illustrating a functional configuration of the host apparatus.

As illustrated in FIG. 8, the host apparatus 2 includes, as hardware, the CPU 51, the memory 52, the LAN ports 55, and FC ports 63. As illustrated in FIG. 9, the host apparatus 2 also includes a control unit 72 that instructs the virtual tape drive 1 to read and write data for the logical volume. The control unit 72 is a function substantially realized by the CPU 51.

Figure 10:
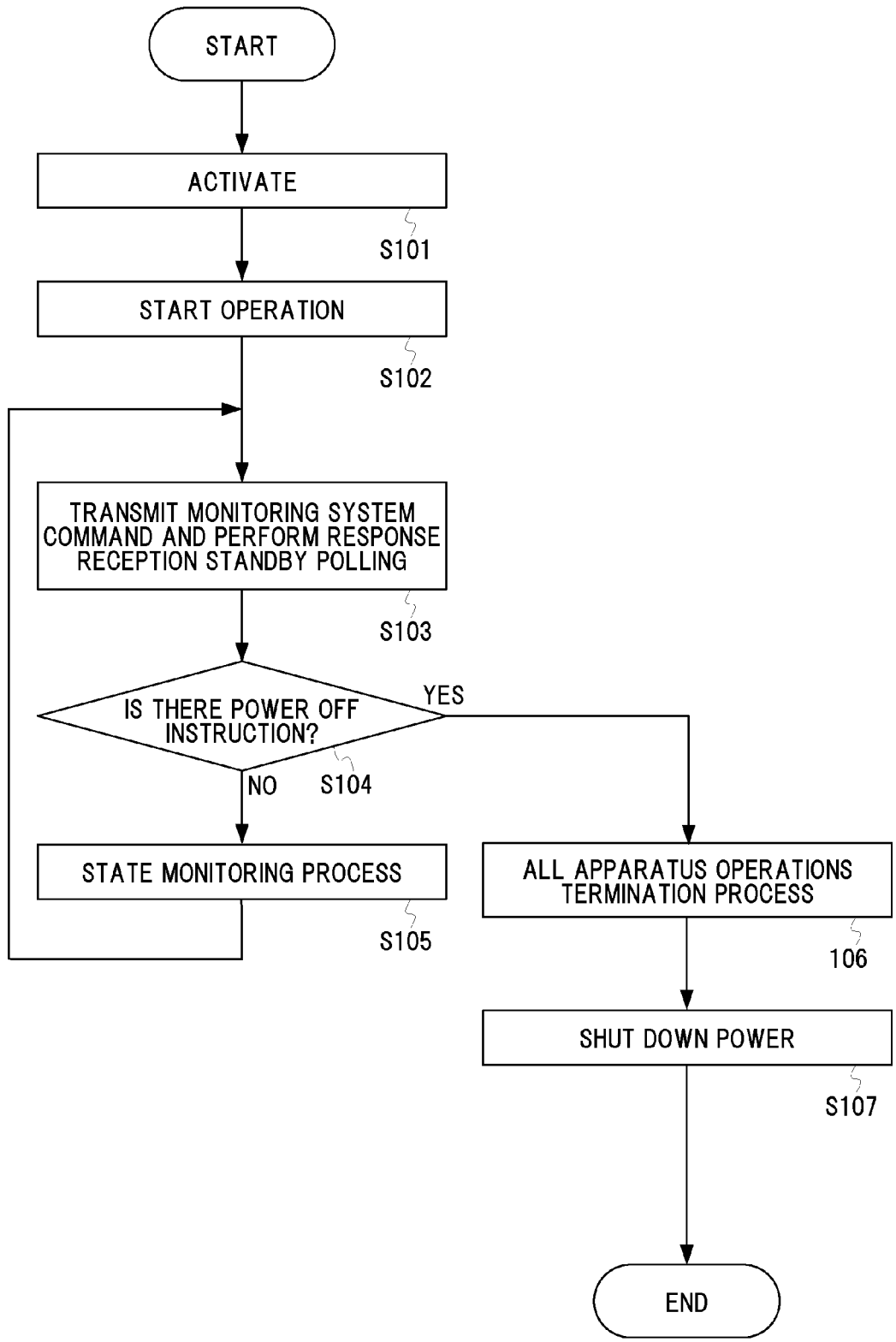
FIG. 10 is a flow chart illustrating an operation of a monitoring control unit.

An operation of a PCU as a monitored apparatus will now be described. FIG. 10 is a flow chart illustrating an operation of a monitoring control unit.

As illustrated in FIG. 10, when power is applied, the monitoring control unit 71 executes an activation sequence process (S101), starts operating the PCU 106 (S102), transmits a monitoring system command to a monitored apparatus, and performs response reception standby polling (S103).

The monitoring control unit 71 then determines whether there is a power OFF instruction from outside the system to the power remote control unit 60 (S104).

If there is no power OFF instruction (S104, NO), the monitoring control unit 71 executes a state monitoring process described below (S105) and again transmits a monitoring system command and performs response reception standby polling (S103).

On the other hand, if there is a power OFF instruction (S104, YES), the monitoring control unit 71 executes a process of terminating the operation of all apparatuses in the virtual tape drive 1 (operation termination process, S106) and instructs the PDU 107 to shut down the power supply to all apparatuses (S107) in the virtual tape drive 1.

Figure 11:
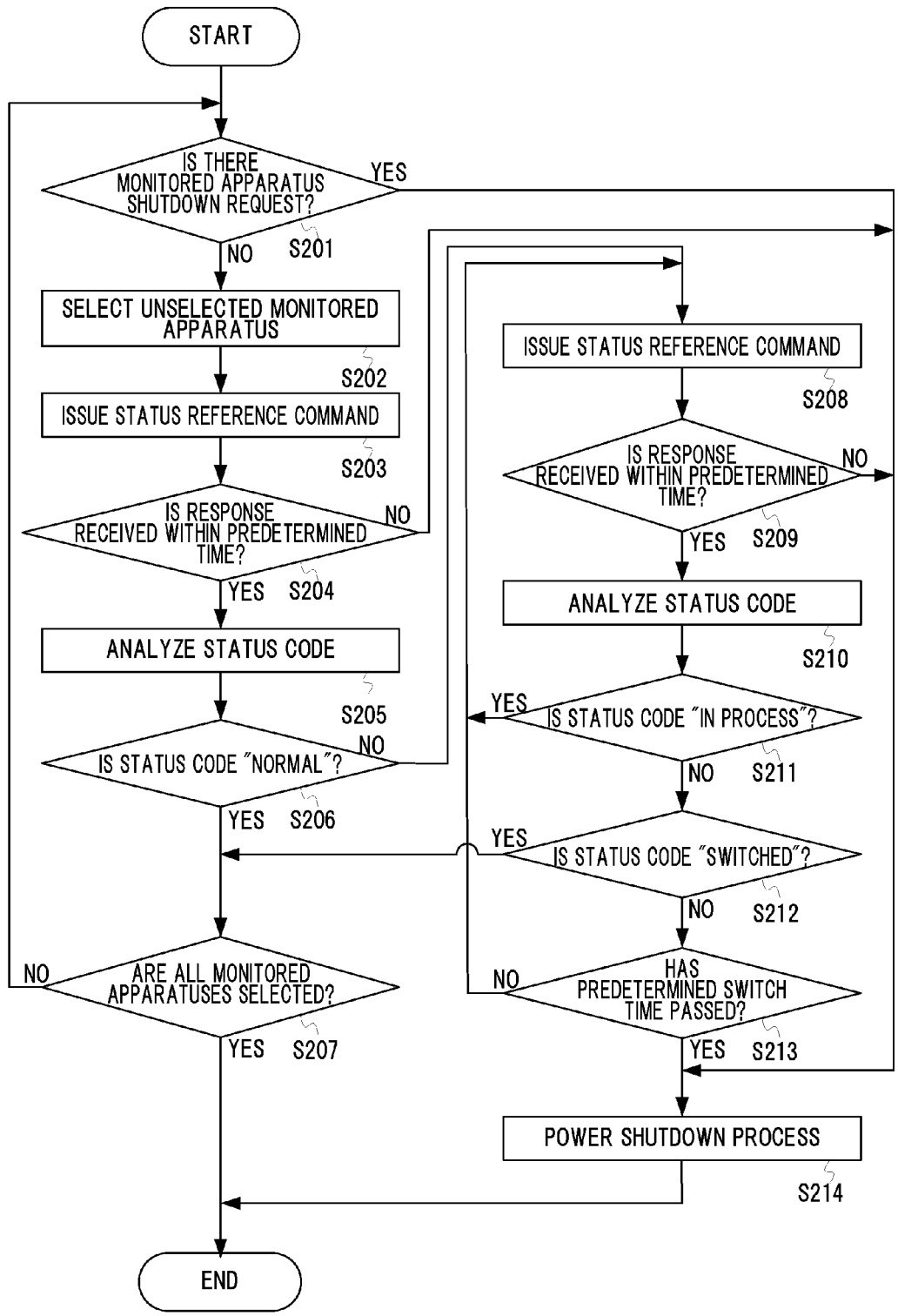
FIG. 11 is a flow chart illustrating an operation of a state monitoring process.

The state monitoring process will now be described. This state monitoring process is the process of step S105 in FIG. 10. FIG. 11 is a flow chart illustrating an operation of the state monitoring process.

As illustrated in FIG. 11, the monitoring control unit 71 determines whether there is a power supply shutdown request of a controlled apparatus from the control unit 72 of the host apparatus 2 (S201).

If there is no power supply shutdown request of a controlled apparatus (S201, NO), the monitoring control unit 71 selects an unselected monitored apparatus based on monitoring target information indicating all controlled apparatuses to be monitored (S202) and issues a status reference command to the selected monitored apparatus (S203, first requesting procedure). The status reference command is a command for requesting the monitored apparatus for a status code response. The monitoring control unit 71 may monitor apparatuses on a network connected to the PCU 106. The monitoring control unit 71 then determines whether a response to the issued status reference command is received within a predetermined time (S204, first determination procedure).

If a response to the status reference command is received within the predetermined time (S204, YES), the monitoring control unit 71 analyzes the received status code (S205) and determines whether the status code is "normal" (S206, second determination procedure).

If the status code is "normal" (S206, YES), the monitoring control unit 71 determines whether all monitored apparatuses are selected (S207).

If all monitored apparatuses are selected (S207, YES), the monitoring control unit 71 ends the state monitoring process.

On the other hand, if all monitored apparatuses are not selected (S207, NO), the monitoring control unit 71 again determines whether there is a power supply shutdown request of a controlled apparatus from the control unit 72 of the host apparatus 2 (S201).

In step S206, if the status code is not "normal" (S206, NO), the monitoring control unit 71 again issues a status reference command to the monitored apparatus being selected (S208, second requesting procedure) and determines whether a response to the issued status reference command is received within a predetermined time (S209, third determination procedure).

If a response to the status reference command is received within the predetermined time (S209, YES), the monitoring control unit 71 analyzes the received status code (S210) and determines whether the status code is "in process" (S211, fourth determination procedure).

If the status code is not "in process" (S211, NO), the monitoring control unit 71 determines whether the status code is "switched" (S212).

If the status code is not "switched" (S212, NO), the monitoring control unit 71 determines whether more than a predetermined switch time has passed for the monitored apparatus being selected (S213).

If more than the predetermined switch time has passed (S213, YES), the monitoring control unit 71 executes a power shutdown process described below (S214) and ends the state monitoring process.

On the other hand, if more than the predetermined switch time has not passed (S213, NO), the monitoring control unit 71 again issues a status reference command (S208).

In step S212, if the status code is "switched" (S212, YES), the monitoring control unit 71 again determines whether all monitored apparatuses are selected (S207).

In step S211, if the status code is "in process" (S211, YES), the monitoring control unit 71 again issues a status reference command (S208).

In step S209, if a response to the status reference command is not received within the predetermined time (S209, NO), the monitoring control unit 71 executes a power shutdown process described below (S214) and ends the state monitoring process.

In step S204, if a response to the status reference command is not received within the predetermined time (S204, NO), the monitoring control unit 71 executes the power shutdown process described below (S214) and ends the state monitoring process.

In step S201, if there is a monitored apparatus shutdown request (S201, YES), the monitoring control unit 71 executes the power shutdown process described below (S214) and ends the state monitoring process.

Figure 14:
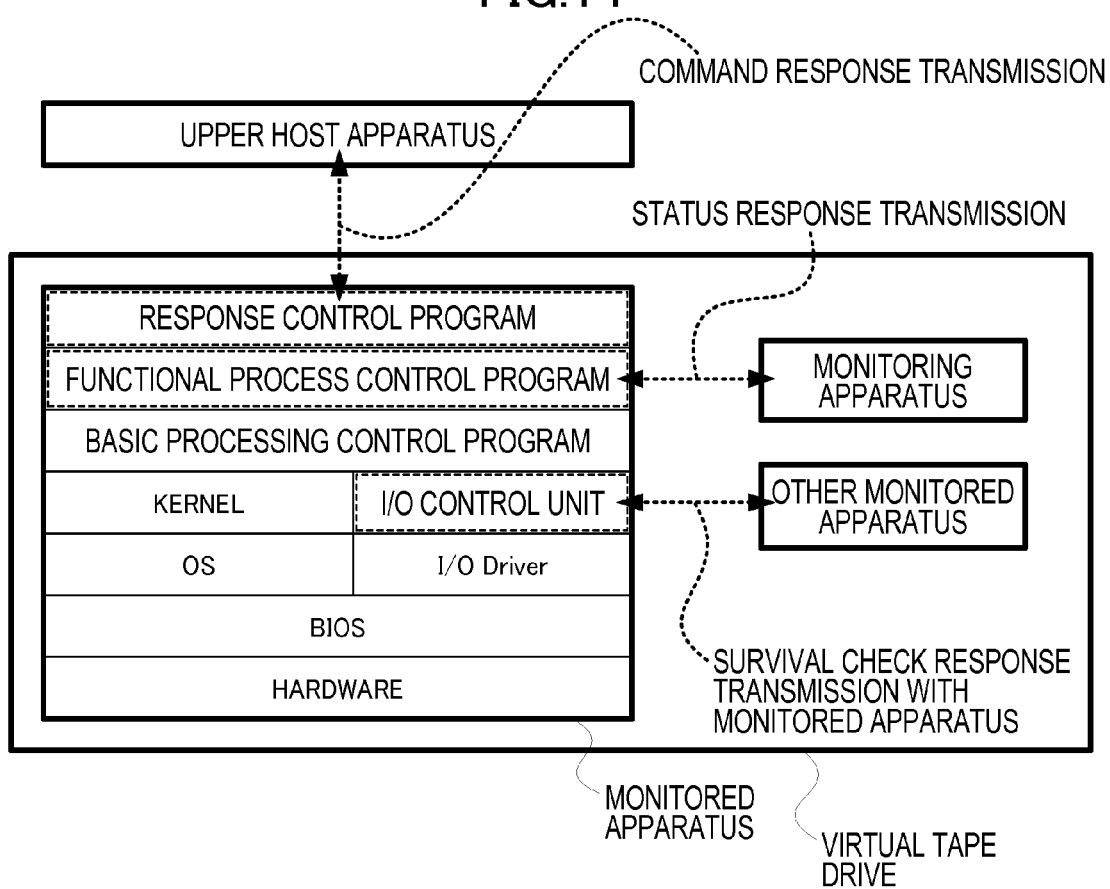
FIG. 14 is a diagram illustrating a hierarchical structure of a monitored apparatus as a lower unit in a virtual tape drive.

In this way, the monitoring control unit 71 determines the case in which the selected status code is "abnormal" and the switching is in process or the switching process is not completed. As a result of the determination, a situation, in which the power is shut down when the operational state of the monitored apparatus is abnormal but the switching process to the standby system is performed without problems, can be prevented. If the monitored apparatus does not respond to the request of the status code, the monitoring control unit 71 applies a power shutdown process to the apparatus to completely terminate the apparatus. As a result, for example, a monitored apparatus, which is hung up in the level for responding to the status code in the hierarchical structure as illustrated in FIG. 14, can be treated.

Figure 12:
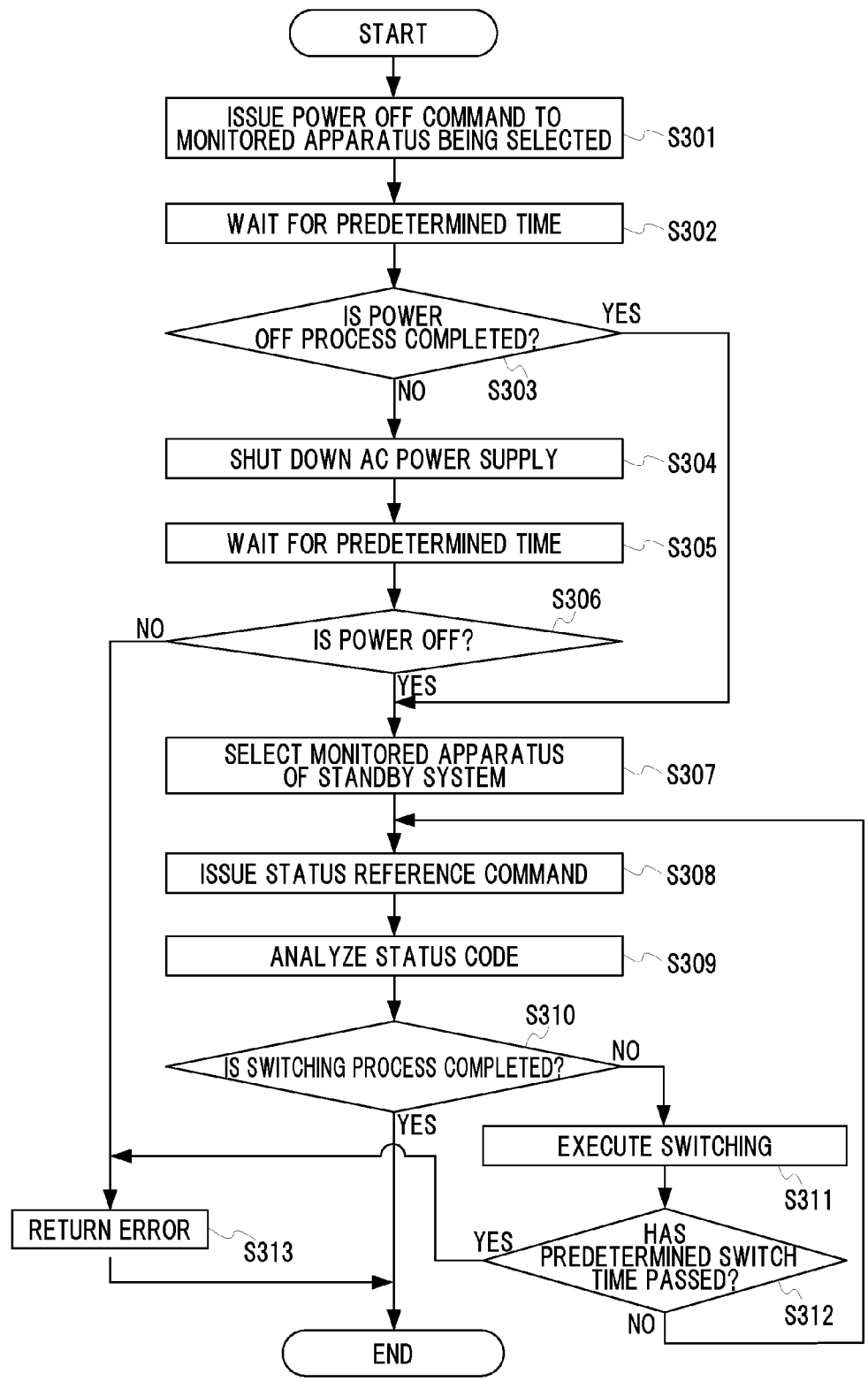
FIG. 12 is a flow chart illustrating an operation of a power shutdown process.

The power shutdown process will now be described. This process is the process of step S214 in FIG. 11. FIG. 12 is a flow chart illustrating an operation of the power shutdown process.

As illustrated in FIG. 12, the monitoring control unit 71 first issues a power OFF command to the monitored apparatus being selected (S301), waits for a predetermined time (S302), and determines whether the monitored apparatus that has issued a command has completed a power OFF process (S303).

If the monitored apparatus has not completed the power OFF process (S303, NO), the monitoring control unit 71 causes the PDU 107 to shut down the power supply to the monitored apparatus (S304, shutdown procedure), waits for a predetermined time (S305), and determines whether the power of the monitored apparatus is OFF (S306). The determination is made based on, for example, the survival check.

If the power of the monitored apparatus is OFF (S306, YES), the monitoring control unit 71 selects a monitored apparatus of the standby system, which is a redundant apparatus, for the monitored apparatus in which the power is turned off (S307) and issues a status reference command (S308).

The monitoring control unit 71 then analyzes a status code as a response to the status reference command (S309) and determines whether the status code is "switched" (S310).

If the status code is "switched" (S310, YES), the monitoring control unit 71 ends the power shutdown process.

On the other hand, if the status code is not "switched" (S310, NO), the monitoring control unit 71 applies a process of switching to the selected monitored apparatus for the monitored apparatus being selected (S311, switching procedure) and determines whether the process has exceeded a predetermine switch time (S312).

If more than the predetermined switch time has not passed (S312, NO), the monitoring control unit 71 again issues a status reference command (S308).

On the other hand, if more than the predetermined switch time has passed (S312, YES), the monitoring control unit 71 returns an error to the host apparatus 2 (S313).

In S306, if the power of the monitored apparatus is not OFF (S306, NO), the monitoring control unit 71 returns an error to the host apparatus 2 (S313).

In S303, if the monitored apparatus has completed the power OFF process (S303, YES), the monitoring control unit 71 selects a monitored apparatus of the standby system, which is a redundant apparatus, for the monitored apparatus in which the power is OFF (S307).

Figure 13:
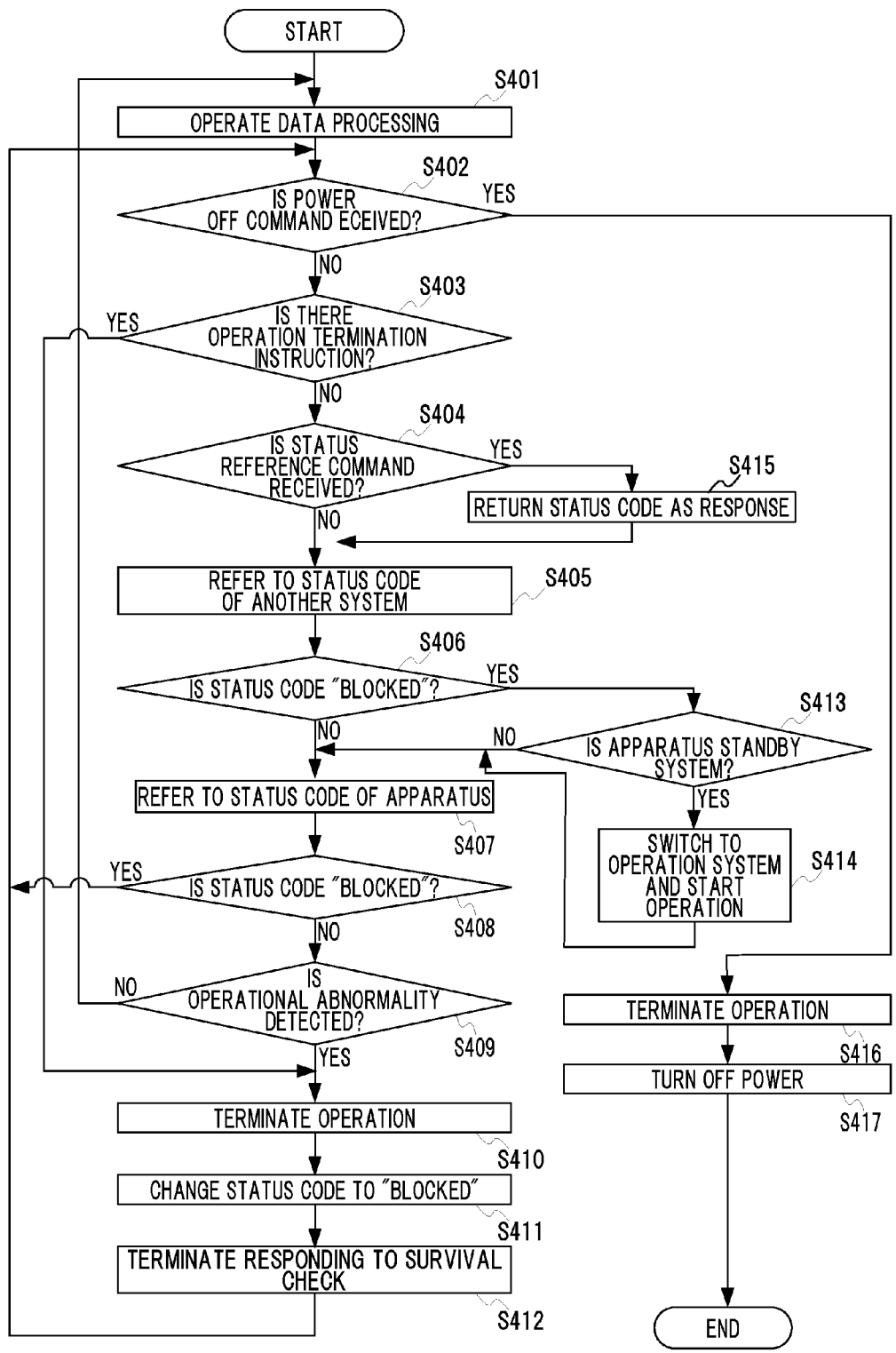
FIG. 13 is a flow chart illustrating an operation of a monitoring response unit.

An operation of a VLP as a monitored apparatus will now be described. FIG. 13 is a flow chart illustrating an operation of a monitoring response unit.

As illustrated in FIG. 13, when the power is applied and a data processing operation is implemented (S401), the monitoring response unit 70 determines whether a power OFF command is received from the PCU 106 as a monitoring apparatus (S402). The data processing operation is an operation for realizing the virtual drive function. For example, in the data processing operation, the VLP 104 mounts the logical volume on the virtual tape drive, manages an information database indicating the relationship between the logical volume and the physical volume, and stores data in the LTO 32.

If the power OFF command is not received (S402, NO), the monitoring response unit 70 determines whether there is an operation termination instruction as an instruction issued by the PCU 106 in the operation termination process (S403).

If there is no operation termination instruction (S403, NO), the monitoring response unit 70 determines whether a status reference command is received (S404).

If the status reference command is not received (S404, NO), the monitoring response unit 70 refers to a status code of a redundant monitored apparatus (VLP 104) of another system (for example, standby system in the case of a monitored apparatus of the operation system) (S405) and determines whether the status code is "blocked" (S406).

If the status code of the monitored apparatus of the other system is not "blocked" (S406, NO), the monitoring response unit 70 refers to the status code of its apparatus (S407) and determines whether the status code is "blocked" (S408).

If the status code of its apparatus is not "blocked" (S408, NO), the monitoring response unit 70 determines whether an operational abnormality is detected in the VLP 104 (S409).

If the operational abnormality is detected (S409, YES), the monitoring response unit 70 changes the status code to "abnormal" and starts a process of terminating the operation (S410). The status code is changed to "in process" during the process of terminating the operation. After the termination of the operation, the monitoring response unit 70 changes the status code to "blocked" (S411), terminates responding to the survival check by another monitored apparatus (S412), and again determines whether a power OFF command is received (S402).

On the other hand, if the operational abnormality is not detected (S409, NO), the monitoring response unit 70 implements a data processing operation (S401).

In step S408, if the status code of its apparatus is "blocked" (S408, YES), the monitoring response unit 70 again determines whether a power OFF command is received (S402).

In step S406, if the status code of the other system is "blocked" (S406, YES), the monitoring response unit 70 determines whether its apparatus is an apparatus belonging to the standby system (S413).

If its apparatus is an apparatus belonging to the standby system (S413, YES), the monitoring response unit 70 executes a switching process to the operation system to start operating as an operation system (S414) and refers to the status code of its apparatus (S407). The status code is changed to "in process" during the switching process of the operation system.

On the other hand, if its apparatus is not an apparatus belonging to the standby system (S413, NO), the monitoring response unit 70 refers to the status code of its apparatus (S407).

In step S404, if the status reference command is received (S404, YES), the monitoring response unit 70 returns the status code as a response (S415) and refers to the status code of the other system (S405).

In S403, if there is no operation termination instruction (S403, YES), the monitoring response unit 70 changes the status code to "abnormal" and starts a process of terminating the operation (S410).

In step S402, if the power OFF command is received (S402, YES), the monitoring response unit 70 changes the status code to "blocked" to start a process of terminating the operation (S410) and turns off the power after the termination of the operation (S417).

As described, the shutdown of the power supply to a monitored apparatus, which is a redundant apparatus in which switching to the standby system is not made even though there is an abnormality, can completely terminate the operation and perform switching to the standby system. As a result, the redundancy of the redundant system can be improved.

The configurations and the operations described above are examples, and the present invention in a redundant configuration can be applied to all systems including units that control the power supply. In the present embodiment, although the PCU 106 monitors the state of the monitored apparatus, the host apparatus 2 may monitor the state of the monitored apparatus, and the PCU 106 may cause the PDU 107 to shut down the power based on the monitored state. For example, the control unit 72 of the host apparatus 2 may execute the state monitoring process illustrated in FIG. 11 and instruct the PCU 106 to execute the process of power shutdown. The PCU 106 and the PDU 107 do not have to be included in each of the operation system and the standby system as long as the power supply of all monitored apparatuses in the redundant system can be controlled. The redundancy of a redundant system can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A redundant system comprising:
   a first apparatus arranged in a redundant configuration with a second apparatus; and
   a control unit that controls a power supply unit that supplies power to the first apparatus, wherein the control unit is not redundant with the first apparatus or the second apparatus, wherein:
   the first apparatus includes a state management unit that manages operational state information indicating an operational state of the first apparatus, and a response unit that returns the operational state information managed by the state management unit to the control unit in response to a request of the operational state information by the control unit, and
   the control unit includes a first requesting unit that requests the first apparatus that operates as an operation system for the operational state information, a first determination unit that determines whether the response by the response unit to the request by the first requesting unit is returned within a predetermined time, a second determination unit that determines whether the operational state indicated by the operational state information as the response to the request by the first requesting unit is normal if the first determination unit determines that the response to the request by the first requesting unit is returned within the predetermined time, and a shutdown unit that shuts down the power supply to the first apparatus, to which the first requesting unit has requested for the operational state information, if the second determination unit determines that the operational state indicated by the operational state information as the response to the request by the first requesting unit is not normal.

2. The redundant system according to claim 1, wherein:
   the shutdown unit shuts down the power supply to the first apparatus, to which the first requesting unit has requested for the operational state information, if the first determination unit determines that the response to the request by the first requesting unit is not returned within the predetermined time.

3. The redundant system according to claim 1, wherein:
   the control unit further includes a second requesting unit that requests the first apparatus, to which the first requesting unit has requested for the operational state information, for the operational state information if the second determination unit determines that the operational state indicated by the operational state information is not normal, a third determination unit that determines whether a response to the request by the second requesting unit is returned within a predetermined time, and a fourth determination unit that determines whether the operational state indicated by the operational state information as the response to the request by the second requesting unit is in process of switching to the second apparatus that is made redundant for the first apparatus if the third determination unit determines that the response to the request by the second requesting unit is returned within the predetermined time, and the shutdown unit shuts down the power supply to the first apparatus, to which the second requesting unit has requested for the operational state information, if the fourth determination unit determines that the operational state indicated by the operational state information is not in process of switching to the second apparatus.

4. The redundant system according to claim 3, wherein:
the shutdown unit shuts down the power supply to the first apparatus, to which the second requesting unit has requested for the operational state information, if the third determination unit determines that the response to the request by the second requesting unit is not returned within the predetermined time.

5. The redundant system according to claim 1, wherein:
the control unit further includes a switch unit that switches the first apparatus, in which the power supply is shut down, to the second apparatus made redundant for the first apparatus if the shutdown unit shuts down the power supply to the first apparatus.

6. The redundant system according to claim 1, wherein:
the first apparatus further includes a reference unit that refers to operational state information of the second apparatus made redundant for the first apparatus, a fifth determination unit that determines whether the second apparatus is a standby system if the operational state indicated by the operational state information referenced by the reference unit indicates that switching to the second apparatus is possible, and a switch unit that switches the second apparatus to an operation system if the fifth determination unit determines that the second apparatus is a standby system.

7. The redundant system according to claim 1, wherein:
the first apparatus in the redundant configuration comprises an element of a virtual tape drive.

8. A control apparatus that controls a power supply unit that supplies power to a first apparatus arranged in a redundant configuration with a second apparatus, the control apparatus comprising:
a first requesting unit that requests the first apparatus that operates as an operation system for operational state information indicating an operational state of the redundant system;
a first determination unit that determines whether a response to the request by the first requesting unit is returned within a predetermined time;
a second determination unit that determines whether the operational state indicated by the operational state information as the response to the request is normal if the first determination unit determines that the response to the request by the first requesting unit is returned within the predetermined time; and a shutdown unit that shuts down the power supply to the first apparatus, to which the first requesting unit has requested for the operational state information, if the second determination unit determines that the operational state indicated by the operational state information as the response to the request by the first requesting unit is not normal,
wherein the control apparatus is not redundant with the first apparatus or the second apparatus.

9. The control apparatus according to claim 8, wherein:
the shutdown unit shuts down the power supply to the first apparatus, to which the first requesting unit has requested for the operational state information, if the first determination unit determines that the response to the request by the first requesting unit is not returned within the predetermined time.

10. The control apparatus according to claim 8, further comprising:
a second requesting unit that requests the first apparatus, to which the first requesting unit has requested for the operational state information, for the operational state information if the second determination unit determines that the operational state indicated by the operational state information is not normal;
a third determination unit that determines whether the response to the request by the second requesting unit is returned within a predetermined time; and
a fourth determination unit that determines whether the operational state indicated by the operational state information as the response to the request by the second requesting unit is in process of switching to a standby system including the second apparatus if the third determination unit determines that the response to the request by the second requesting unit is returned within the predetermined time, wherein:
the shutdown unit shuts down the power supply to the first apparatus, to which the second requesting unit has requested for the operational state information, if the fourth determination unit determines that the operational state indicated by the operational state information is not in process of switching to the second apparatus made redundant for the first apparatus.

11. The control apparatus according to claim 10, wherein:
the shutdown unit shuts down the power supply to the first apparatus, to which the second requesting unit has requested for the operational state information, if the third determination unit determines that the response to the request by the second requesting unit is not returned within the predetermined time.

12. The control apparatus according to claim 8, further comprising:
a switch unit that switches the first apparatus, in which the power supply is shut down, to the second apparatus made redundant for the first apparatus if the shutdown unit shuts down the power supply to the first apparatus.

13. The control apparatus according to claim 8, wherein:
the first apparatus that operates as an operation system comprises an element of a virtual tape drive.

14. A control method implemented by a control apparatus for controlling a power supply unit that supplies power to a first apparatus in a redundant configuration with a second apparatus, the method comprising:
a first requesting procedure for requesting the first apparatus that operates as an operation system for operational state information indicating an operational state of the first apparatus;

a first determination procedure for determining whether a response to the request in the first requesting procedure is returned within a predetermined time;
a second determination procedure for determining whether an operational state indicated by the operational state information as the response to the request is normal if it is determined in the first determination procedure that the response to the request in the first requesting procedure is returned within the predetermined time; and
a shutdown procedure for shutting down the power supply to the first apparatus, to which the operational state information is requested in the first requesting procedure, if it is determined in the second determination procedure that the operational state indicated by the operational state information as the response to the request in the first requesting procedure is not normal,
wherein the control apparatus is not redundant with the first apparatus or the second apparatus.

15. The method according to claim 14, wherein:
in the shutdown procedure, the power supply to the first apparatus, to which the operational state information is requested in the first requesting procedure, is shut down if it is determined in the first determination procedure that the response to the request in the first requesting procedure is not returned within the predetermined time.

16. The method according to claim 14, further comprising:
a second requesting procedure for requesting the first apparatus, to which the operational state information is requested in the first requesting procedure, for the operational state information if it is determined in the second determination procedure that the operational state indicated by the operational state information is not normal;
a third determination procedure for determining whether a response to the request in the second requesting procedure is returned within a predetermined time; and
a fourth determination procedure for determining whether the operational state indicated by the operational state information as the response to the request in the second requesting procedure is in process of switching to a standby system including the second apparatus if it is determined in the third determination procedure that the response to the request in the second requesting procedure is returned within the predetermined time, wherein:
in the shutdown procedure, the power supply to the first apparatus, to which the operational state information is requested in the second questing procedure, is shut down if it is determined in the fourth determination procedure that the operational state indicated by the operational state information is not in process of switching to the second apparatus made redundant for the first apparatus.

17. The method according to claim 16, wherein:
in the shutdown procedure, the power supply to the first apparatus, to which the operational state information is requested in the second requesting procedure, is shut down if it is determined in the third determination procedure that the response to the request in the second requesting procedure is not returned within the predetermined time.

18. The method according to claim 14, further comprising:
a switching procedure for switching the first apparatus, in which the power supply is shut down, to the second apparatus made redundant for the first apparatus if the power supply to the first apparatus is shut down in the shutdown procedure.

19. The method according to claim 14, wherein:
the first apparatus that operates as an operation system comprises an element of a virtual tape drive.

* * * * *